USUS005529459A

United States Patent [19]

Pancotti

[11] Patent Number: 5,529,459
[45] Date of Patent: Jun. 25, 1996

[54] HELICOPTER ROTOR BRAKE DEVICE

[75] Inventor: Santino Pancotti, Gallarate, Italy

[73] Assignee: Agusta Eli S.r.l., Via Giovanni Agusta, Italy

[21] Appl. No.: 368,535

[22] Filed: Jan. 4, 1995

[30] Foreign Application Priority Data

Jan. 11, 1994 [IT] Italy .................... TO94A0007

[51] Int. Cl.⁶ .................... B64C 11/00
[52] U.S. Cl. .................... 416/169; 192/53.1; 192/69.3
[58] Field of Search .................... 416/169 R; 192/53 B, 192/67 A

[56]  References Cited

U.S. PATENT DOCUMENTS

| | | | |
|---|---|---|---|
| 1,739,946 | 12/1929 | Carhart | 192/53 B |
| 2,393,398 | 1/1946 | Nabstedt | 192/53 B |
| 2,465,538 | 3/1949 | Jensen | 416/169 |
| 2,738,045 | 3/1956 | Mergan et al. | |
| 3,679,033 | 7/1972 | Wagner | 416/169 |
| 4,376,614 | 3/1983 | Woodruff | 416/169 |
| 4,642,029 | 2/1987 | Cedoz | 416/169 |

FOREIGN PATENT DOCUMENTS

| | | | |
|---|---|---|---|
| 2604228 | 3/1988 | France | 192/67 A |
| 2008206 | 5/1979 | United Kingdom | 192/53 B |

OTHER PUBLICATIONS

US 7041387 (NASA) Whole document filed Apr. 23, 1987. Search report listing references.

Primary Examiner—Edward K. Look
Assistant Examiner—Mark Sgantzos
Attorney, Agent, or Firm—Kane, Dalsimer, Sullivan, Kurucz, Levy, Eisele and Richard

[57]  ABSTRACT

A helicopter rotor brake device includes a fixed casing. A shaft is supported in a rotationally free manner inside the casing and is rotatably connectable to the rotor. A pair of first friction disks connected to the casing. A hub is fitted integral with a second friction disk interposed axially between the first friction disks and cooperates in a sliding manner with the same when loaded axially. A clutch is interposed between the shaft and the hub and is movable between an idle position corresponding to a rotational disconnection of the hub and the shaft, and an operating position corresponding to a rotational connection of the hub and the shaft.

7 Claims, 1 Drawing Sheet

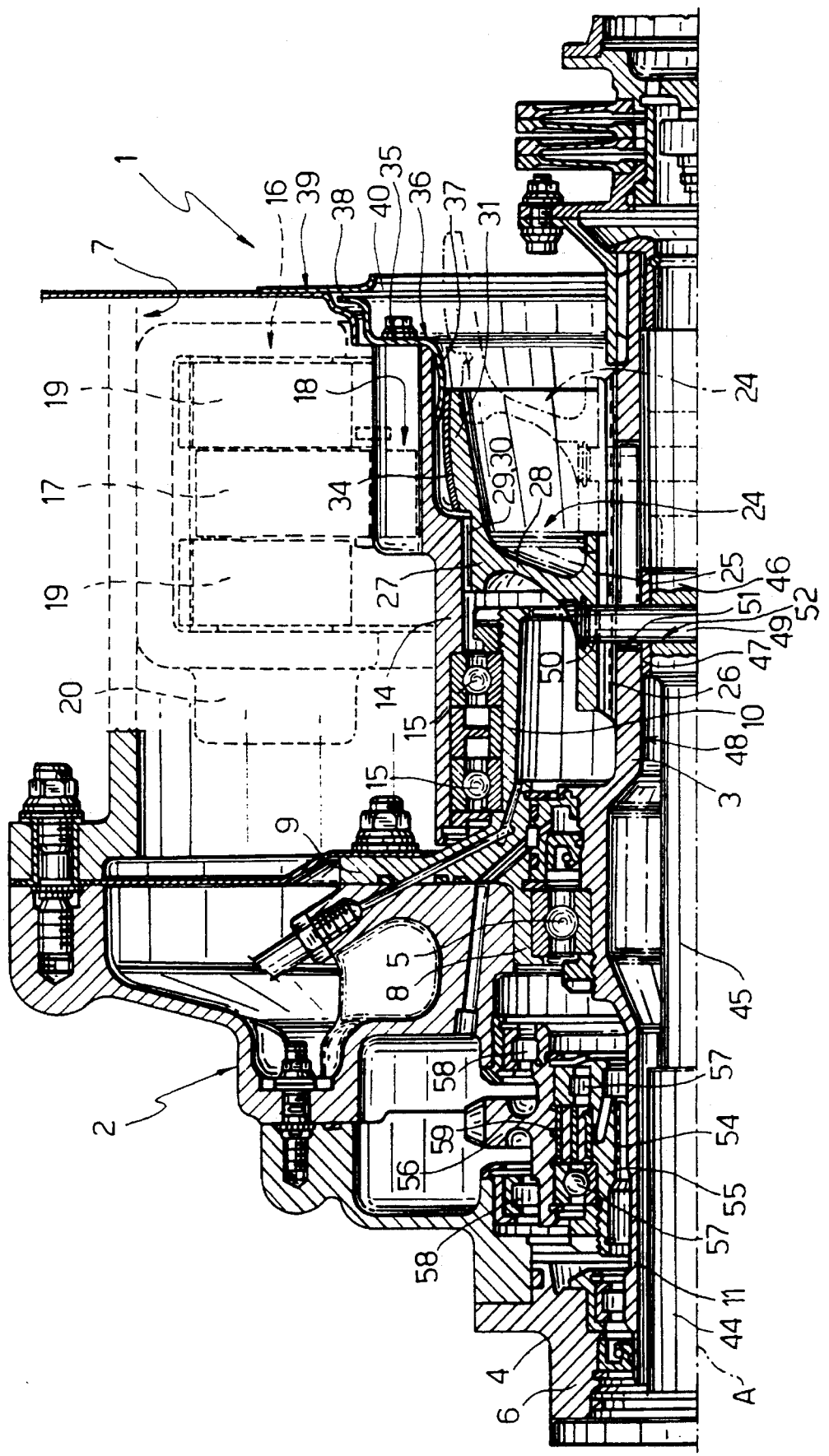

HELICOPTER ROTOR BRAKE DEVICE

BACKGROUND OF THE INVENTION

The present invention relates to a helicopter rotor brake device.

As is known, helicopters feature a rotor brake device which acts on a shaft connected to the rotor via a transmission. The brake device normally comprises a hub connected to the shaft and fitted integral with one or more friction disks interposed between respective pairs of fixed friction disks or sectors with which they cooperate in sliding manner when axially loaded.

Known brake devices of the type briefly described above present a major drawback.

As the friction disks on the hub are rotated constantly and moved towards the fixed disks or sectors, a malfunction may result in relative sliding of the disks even when no axial load is applied, thus generating heat by friction; and, in extreme cases, despite all the precautions taken to avoid it, the brake device may overheat to such an extent as to seriously impair operation or even cause a fire.

SUMMARY OF THE INVENTION

It is an object of the present invention to provide a helicopter brake device designed to overcome the aforementioned drawback typically associated with known devices.

According to the present invention, there is provided a helicopter rotor brake device comprising a fixed casing; a shaft rotatably supported inside said casing and rotatably connected to said rotor; at least one pair of friction elements connected angularly to said casing; a hub fitted integral with at least one friction disk interposed axially between said friction elements and cooperating in sliding manner with said friction elements when axially loaded; and angular connecting means interposed between said shaft and said hub; characterized in that said angular connecting means comprise clutch means movable between an idle position corresponding to rotational disconnection of said hub and said shaft, and an operating position corresponding to rotational connection of said hub and said shaft.

BRIEF DESCRIPTION OF THE DRAWING

A preferred, non-limiting embodiment of the present invention will be described by way of example with reference to the accompanying drawing showing a partial half section.

DETAILED DESCRIPTION OF THE INVENTION

Number 1 in the accompanying drawing indicates a brake device for a helicopter rotor (not shown).

Device 1 comprises a substantially bell-shaped outer casing or stator 2 presenting an axis A and defining an end opening 7; and a shaft 3 presenting axis A and connectable angularly to the rotor via known transmission means not described in detail. Shaft 3 is hollow, and is supported in rotational free manner inside casing 2 by means of a pair of bearings 4, 5.

More specifically, one of the bearings (4) is housed in the end portion 6 of casing 2 opposite opening 7, and supports an end portion 11 of shaft 3; and the other bearing (5) is housed in a cylindrical sleeve 8 defined by an intermediate transverse wall 9 fixed rigidly to casing 2.

A tubular portion 10 extends axially from wall 9 towards opening 7, and is fitted in projecting manner with a hub 14 supported in a rotatably free manner on a pair of bearings 15. Hub 14 forms part of a disk brake 16 housed in casing 2 close to end 7 and which interacts with shaft 3 to brake the rotor.

Brake 16 (shown schematically by the dotted line and of known type) comprises a friction disk 17 conveniently made of graphite and which is fitted to hub 14 by means of a toothed coupling 18. Disk 17 is interposed axially between a pair of friction disks 19 also preferably made of graphite and which are connected angularly to casing 2 and, hence, angularly fixed. Disk 17 cooperates in sliding manner with disks 19 when subjected to an axial load generated by an actuator 20.

Hub 14 is rotatably connectable to shaft 3 by means of a clutch element 24 comprising a cylindrical inner sleeve 25 fitted to shaft 3 in rotatable fixed and axially-sliding manner by a splined coupling 26; and an outer ring gear 27 connected integral with sleeve 25 by a flange 28, and presenting external radial teeth 29 meshing with internal teeth 30 on hub 14.

Clutch element 24 also comprises an integral synchronizing ring 31 projecting axially from ring gear 27 towards opening 7 of casing 2. In axial section, ring 31 is substantially barrel-shaped, increasing in diameter towards its free axial end, and presents an outer covering 34 of material with a high friction coefficient.

The front surface 35 of hub 14 facing opening 7 of casing 2 is fitted with a sheet metal ring 36 presenting a number of elastic blades 37 which are bent inwards of hub 14, present a curved longitudinal section with its convexity facing axis A, and cooperate with synchronizing ring 31 as described later on.

Ring 36 presents a peripheral flange 38 which, together with a sheet metal guard 39 integral with casing 2 and closing opening 7, defines a labyrinth seal 40.

Brake device 1 also comprises a linear actuator 44 for controlling clutch element 24 and housed coaxially inside shaft 3. Actuator 44 presents a movable rod 45 fitted at one end 46 with a guide ring 47 made of material with a low friction coefficient, e.g. PTFE, and cooperating with the inner surface 48 of shaft 3. End 46 presents a transverse hole 52 housing a drive pin 49 with end portions 50 (only one shown) projecting outwards of shaft 3 through respective openings 51 in shaft 3, and connected to clutch element 24.

Clutch element 24 is moved by actuator 44 between a first idle position (shown by the dotted line) wherein it does not cooperate with hub 14 which is therefore disconnected rotationally from shaft 3, and a second position (shown by the continuous line) wherein teeth 29 of clutch element 24 mesh with teeth 30 of hub 14 which is thus connected rotationally to shaft 3.

By means of a splined coupling 54, end portion 11 of shaft 3 is fitted with a sleeve 55 in turn fitted with a gear 56 for transmitting motion from shaft 3 to an accessory box (not shown) comprising, for example, one or more pumps for pressurizing operating fluid, and one or more alternators. In addition to being powered by the rotor via shaft 3, the accessory box is also powered by one of the engines driving the rotor itself (not shown).

Gear 56 is supported on sleeve 55 by means of a first pair of bearings 57; is supported in relation to casing 2 by means of a second pair of bearings 58; and is also connected rotationally and in one-way manner to sleeve 55 by a free wheel 59, for enabling the accessory box to be driven by shaft 3, but for preventing motion from being transmitted in the opposite direction when the accessory box is driven by the aforementioned engine and the rotor (and hence shaft 3) is stationary.

Device 1 operates as follows.

In any operating condition in which the rotor brake is idle, and particularly in flight, clutch element 24 is normally maintained by actuator 44 in the idle position; and hub 14 is disconnected from shaft 3, so that neither hub 14 nor friction disk 17 is rotated, thus eliminating any danger of disk 17 sliding in relation to fixed disks 19.

Conversely, when the rotor is braked, e.g. upon landing, actuator 44 is operated to shift clutch element 24 into the operating position. During shifting, and before teeth 29 of clutch element 24 can mesh with teeth 30 of hub 14, synchronizing ring 31 engages blades 37 of ring 36 and, by force of friction, rotates ring 36 and hub 14 integral with it; which mutual engagement is effected smoothly and gradually by virtue of the shape, described previously, of ring 31 and blades 37. As clutch element 24 is shifted further, synchronizing ring 31 parts and flexes blades 37 so as to increase the contact pressure on, and hence the torque transmitted by friction to, ring 36 and hub 14. Said torque therefore provides for synchronizing hub 14, and, over the final portion of the travel of clutch element 24, teeth 29 mesh with teeth 30 to connect hub 14 angularly to shaft 3, at which point disk brake 16 is operated normally to brake shaft 3.

The advantages of device 1 according to the present invention will be clear from the foregoing description.

In particular, by virtue of hub 14 of brake 16 only being connected rotatably to shaft 3 when the brake device is operated, any possibility of accidental sliding under normal operating conditions of the rotor, and hence overheating and malfunctioning of the brake device, is eliminated.

Clearly, changes may be made to device 1 as described and illustrated herein without, however, departing from the scope of the present invention.

In particular, different clutch means, such as an automotive clutch, may be interposed between hub 14 and shaft 3.

I claim:

1. A helicopter rotor brake device (1) comprising a fixed casing (2); a shaft (3) rotatably supported inside said casing (2) and drivingly connectable to the rotor, at least one pair of friction elements (19) connected to said casing (2); a hub (14) fitted rotationally and integral with at least one friction disk (17) interposed axially between said friction elements (19) and cooperating in sliding manner with said friction elements (19) when axially loaded; and connecting means (24) interposed between said shaft (3) and said hub (14); characterized in that said connecting means comprise clutch means (24) movable between an idle position at which said hub (14) and said shaft (3) are rotationally disconnected, and an operating position at which said hub (14) and said shaft (3) are rotationally connected.

2. A device as claimed in claim 1, characterized in that said clutch means comprise synchronizing means (31, 36) for synchronizing said hub (14) in relation to said shaft (3).

3. A device as claimed in claim 1, characterized in that said clutch means comprise a clutch element (24) connected for rotation to said shaft (3) and slidable axially along the same between said idle and said operating position; said clutch element (24) being connectable to said hub (14) by means of respective radial teeth (29, 30).

4. A device as claimed in claim 2, characterized in that said synchronizing means comprise a synchronizing ring (31) integral with said clutch element (24); and a ring (36) fitted to said hub (14) and having a number of elastic blades (37) cooperating with said synchronizing ring (31).

5. A device as claimed in claim 1, characterized in that an actuator is provided (44) for controlling said clutch means (24).

6. A device as claimed in claim 5, characterized in that said shaft (3) is hollow; and said actuator (44) is housed inside said shaft (3).

7. A device as claimed in claim 6, characterized in that said actuator (44) comprises a rod (45) movable axially and secured to said clutch element (24) by means of a transverse pin (49) having end portions (50) connected to said clutch element (24) and slidable in axial opening (51) in said shaft.

* * * * *